(12) United States Patent
Cheng et al.

(10) Patent No.: US 9,595,129 B2
(45) Date of Patent: Mar. 14, 2017

(54) CANVAS CONTROL FOR 3D DATA VOLUME PROCESSING

(71) Applicants: Yao-Chou Cheng, Houston, TX (US); Marek K. Czernuszenko, Sugar Land, TX (US)

(72) Inventors: Yao-Chou Cheng, Houston, TX (US); Marek K. Czernuszenko, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 14/385,965

(22) PCT Filed: Apr. 9, 2013

(86) PCT No.: PCT/US2013/035841
§ 371 (c)(1),
(2) Date: Sep. 17, 2014

(87) PCT Pub. No.: WO2013/169429
PCT Pub. Date: Nov. 14, 2013

(65) Prior Publication Data
US 2015/0049084 A1     Feb. 19, 2015

Related U.S. Application Data

(60) Provisional application No. 61/644,196, filed on May 8, 2012.

(51) Int. Cl.
*G06T 15/00* (2011.01)
*G06T 15/08* (2011.01)

(52) U.S. Cl.
CPC ................... *G06T 15/08* (2013.01)

(58) Field of Classification Search
CPC .................................................... G06T 15/08
(Continued)

(56) References Cited

U.S. PATENT DOCUMENTS 5,468,088 A    11/1995    Shoemaker et al.
5,671,136 A    9/1997    Willhoit
(Continued)

FOREIGN PATENT DOCUMENTS

CA    2312381    6/1999
EP    1036341    11/1998
(Continued)

OTHER PUBLICATIONS

Resmi et al, A Semi-Automatic Method for Segmentation and 3D modeling of glioma tumors from brain MRI, J. Biomedical Science and Engineering, 2012, 5, 378-383.*

(Continued)

*Primary Examiner* — Phu K Nguyen
(74) *Attorney, Agent, or Firm* — ExxonMobil Upstream Research Company—Law Department

(57) ABSTRACT

A method is provided for displaying selected portions of a three-dimensional (3D) volumetric data set representing a subsurface formation. At least one two-dimensional (2D) canvas is generated. The 2D canvas corresponds to a plane in the 3D data set. The 2D canvas is shown in a first display window. One or more primitives are created on the 2D canvas. A volumetric region of the 3D volumetric data set corresponding to the one or more primitives is identified. The volumetric region is displayed in a 3D scene. The 3D scene is shown in a second display window.

25 Claims, 15 Drawing Sheets

(58) Field of Classification Search
USPC .................. 345/419, 424, 440; 703/10, 14
See application file for complete search history.

(56) References Cited

U.S. PATENT DOCUMENTS

| | | | |
|---|---|---|---|
| 5,708,764 A | 1/1998 | Borrel et al. |
| 5,992,519 A | 11/1999 | Ramakrishnan et al. |
| 6,035,255 A | 3/2000 | Murphy et al. |
| 6,044,328 A | 3/2000 | Murphy et al. |
| 6,070,125 A | 5/2000 | Murphy et al. |
| 6,128,577 A | 10/2000 | Assa et al. |
| 6,191,787 B1 | 2/2001 | Lu et al. |
| 6,219,061 B1 | 4/2001 | Lauer et al. |
| 6,236,994 B1 | 5/2001 | Swartz et al. |
| 6,353,677 B1 | 3/2002 | Pfister et al. |
| 6,373,489 B1 | 4/2002 | Lu et al. |
| 6,388,947 B1 | 5/2002 | Washbourne et al. |
| 6,490,528 B2 | 12/2002 | Cheng et al. |
| 6,516,274 B2 | 2/2003 | Cheng et al. |
| 6,519,568 B1 | 2/2003 | Harvey et al. |
| 6,549,854 B1 | 4/2003 | Malinverno et al. |
| 6,549,879 B1 | 4/2003 | Cullick et al. |
| 6,643,656 B2 | 11/2003 | Peterson |
| 6,664,961 B2 | 12/2003 | Ray et al. |
| 6,690,820 B2 | 2/2004 | Lees et al. |
| 6,694,264 B2 | 2/2004 | Grace |
| 6,697,063 B1 | 2/2004 | Zhu |
| 6,757,613 B2 | 6/2004 | Chapman et al. |
| 6,765,570 B1 | 7/2004 | Cheung et al. |
| 6,766,254 B1 | 7/2004 | Bradford et al. |
| 6,772,066 B2 | 8/2004 | Cook |
| 6,823,266 B2 | 11/2004 | Czernuszenko et al. |
| 6,826,483 B1 | 11/2004 | Anderson et al. |
| 6,829,570 B1 | 12/2004 | Thambynayagam et al. |
| 6,834,732 B2 | 12/2004 | Haarstad |
| 6,839,632 B2 | 1/2005 | Grace |
| 6,912,467 B2 | 6/2005 | Schuette |
| 6,912,468 B2 | 6/2005 | Marin et al. |
| 6,940,507 B2 | 9/2005 | Repin et al. |
| 6,968,909 B2 | 11/2005 | Aldred et al. |
| 6,980,939 B2 | 12/2005 | Dhir et al. |
| 6,980,940 B1 | 12/2005 | Gurpinar et al. |
| 6,987,878 B2 | 1/2006 | Lees et al. |
| 6,993,434 B2 * | 1/2006 | Cheng .................. G01V 1/28 702/16 |
| 7,003,439 B2 | 2/2006 | Aldred et al. |
| 7,006,085 B1 | 2/2006 | Acosta et al. |
| 7,027,925 B2 | 4/2006 | Terentyev et al. |
| 7,031,842 B1 | 4/2006 | Musat et al. |
| 7,050,953 B2 | 5/2006 | Chiang et al. |
| 7,079,953 B2 | 7/2006 | Thorne et al. |
| 7,096,172 B2 | 8/2006 | Colvin et al. |
| 7,098,908 B2 | 8/2006 | Acosta et al. |
| 7,136,064 B2 | 11/2006 | Zuiderveld |
| 7,181,380 B2 | 2/2007 | Dusterhoft et al. |
| 7,203,342 B2 | 4/2007 | Pedersen |
| 7,248,256 B2 | 7/2007 | Minami et al. |
| 7,248,258 B2 | 7/2007 | Acosta et al. |
| 7,272,973 B2 | 9/2007 | Craig |
| 7,281,213 B2 | 10/2007 | Callegari |
| 7,283,941 B2 | 10/2007 | Horowitz et al. |
| 7,314,588 B2 | 1/2008 | Blankenship |
| 7,330,791 B2 | 2/2008 | Kim et al. |
| 7,337,067 B2 | 2/2008 | Sanstrom |
| 7,359,845 B2 | 4/2008 | Kelfoun |
| 7,362,329 B2 | 4/2008 | Zuiderveld |
| 7,366,616 B2 | 4/2008 | Bennett et al. |
| 7,373,251 B2 | 5/2008 | Hamman et al. |
| 7,412,363 B2 | 8/2008 | Callegari |
| 7,437,358 B2 | 10/2008 | Arrouye et al. |
| 7,451,066 B2 | 11/2008 | Edwards et al. |
| 7,460,957 B2 | 12/2008 | Prange et al. |
| 7,478,024 B2 | 1/2009 | Gurpinar et al. |
| 7,502,026 B2 | 3/2009 | Acosta et al. |
| 7,512,543 B2 | 3/2009 | Raghuraman et al. |
| 7,539,625 B2 | 5/2009 | Klumpen et al. |
| 7,546,884 B2 | 6/2009 | Veeningen et al. |
| 7,548,873 B2 | 6/2009 | Veeningen et al. |
| 7,565,243 B2 | 7/2009 | Kim et al. |
| 7,576,740 B2 | 8/2009 | Dicken |
| 7,584,086 B2 | 9/2009 | Frankel |
| 7,596,481 B2 | 9/2009 | Zamora et al. |
| 7,603,264 B2 | 10/2009 | Zamora et al. |
| 7,603,265 B2 | 10/2009 | Mainguy et al. |
| 7,606,666 B2 | 10/2009 | Repin et al. |
| 7,616,213 B2 | 11/2009 | Chuter |
| 7,627,430 B2 | 12/2009 | Hawtin |
| 7,630,872 B2 | 12/2009 | Xia et al. |
| 7,630,914 B2 | 12/2009 | Veeningen et al. |
| 7,657,407 B2 | 2/2010 | Logan |
| 7,657,414 B2 | 2/2010 | Zamora et al. |
| 7,668,700 B2 | 2/2010 | Erignac et al. |
| 7,684,929 B2 | 3/2010 | Prange et al. |
| 7,711,532 B2 | 5/2010 | Dulac et al. |
| 7,725,302 B2 | 5/2010 | Ayan et al. |
| 7,739,623 B2 * | 6/2010 | Liang .................. G06T 19/00 382/128 |
| 7,743,006 B2 | 6/2010 | Woronow et al. |
| 7,796,468 B2 | 9/2010 | Kellogg |
| 7,814,989 B2 | 10/2010 | Nikolakis-Mouchas et al. |
| 7,876,705 B2 | 1/2011 | Gurpinar et al. |
| 7,913,190 B2 | 3/2011 | Grimaud et al. |
| 7,925,483 B2 | 4/2011 | Xia et al. |
| 7,953,585 B2 | 5/2011 | Gurpinar et al. |
| 7,953,587 B2 | 5/2011 | Bratton et al. |
| 7,970,545 B2 | 6/2011 | Sanstrom |
| 7,986,319 B2 | 7/2011 | Dommisse et al. |
| 7,991,600 B2 | 8/2011 | Callegari |
| 7,995,057 B2 | 8/2011 | Chuter |
| 8,005,658 B2 | 8/2011 | Tilke et al. |
| 8,055,026 B2 | 11/2011 | Pedersen |
| 8,073,664 B2 | 12/2011 | Schottle et al. |
| 8,094,515 B2 | 1/2012 | Miller et al. |
| 8,103,493 B2 | 1/2012 | Sagert et al. |
| 8,145,464 B2 | 3/2012 | Arnegaard et al. |
| 8,150,663 B2 | 4/2012 | Mallet |
| 8,155,942 B2 | 4/2012 | Sarma et al. |
| 8,199,166 B2 | 6/2012 | Repin et al. |
| 8,301,426 B2 | 10/2012 | Abasov et al. |
| 8,325,179 B2 | 12/2012 | Murray et al. |
| 8,345,929 B2 | 1/2013 | Kovacic et al. |
| 8,346,695 B2 | 1/2013 | Pepper et al. |
| 8,364,404 B2 | 1/2013 | Legendre et al. |
| 8,381,815 B2 | 2/2013 | Karanikas et al. |
| 8,483,852 B2 | 7/2013 | Kurtenbach |
| 8,521,837 B2 | 8/2013 | Badheka et al. |
| 8,638,328 B2 | 1/2014 | Lin |
| 8,686,996 B2 | 4/2014 | Cheung et al. |
| 8,698,798 B2 | 4/2014 | Murray et al. |
| 8,727,017 B2 | 5/2014 | Hilliard et al. |
| 8,786,604 B2 | 7/2014 | Gorell |
| 8,797,319 B2 | 8/2014 | Lin |
| 8,803,878 B2 | 8/2014 | Andersen et al. |
| 8,812,334 B2 | 8/2014 | Givens et al. |
| 8,849,630 B2 * | 9/2014 | Amemiya .............. G06F 1/206 703/14 |
| 8,849,640 B2 | 9/2014 | Holl et al. |
| 8,884,964 B2 * | 11/2014 | Holl .................. G01V 1/34 345/440 |
| 8,892,407 B2 * | 11/2014 | Budiman ............. E21B 47/022 703/10 |
| 8,931,580 B2 * | 1/2015 | Cheng ................. E21B 43/30 175/45 |
| 9,008,972 B2 * | 4/2015 | Imhof .................. G01V 1/32 702/13 |
| 9,026,417 B2 * | 5/2015 | Sequeira, Jr. ......... E21B 41/00 703/10 |
| 9,070,049 B2 | 6/2015 | Fredrich et al. |
| 9,098,647 B2 * | 8/2015 | Boyd .............. G06F 3/04815 |
| 9,123,161 B2 * | 9/2015 | Adair ................. G06T 19/00 |
| 2002/0177955 A1 | 11/2002 | Jalali et al. |
| 2004/0012670 A1 | 1/2004 | Zhang |
| 2004/0207652 A1 | 10/2004 | Ratti et al. |
| 2004/0210395 A1 | 10/2004 | Cheng et al. |

(56) References Cited

U.S. PATENT DOCUMENTS

| | | |
|---|---|---|
| 2005/0119959 A1 | 6/2005 | Eder |
| 2005/0171700 A1 | 8/2005 | Dean |
| 2005/0213809 A1 | 9/2005 | Lees et al. |
| 2006/0224423 A1 | 10/2006 | Sun et al. |
| 2006/0247903 A1 | 11/2006 | Schottle |
| 2006/0265508 A1 | 11/2006 | Angel et al. |
| 2007/0266082 A1 | 11/2007 | McConnell et al. |
| 2008/0088621 A1 | 4/2008 | Grimaud et al. |
| 2008/0144903 A1 | 6/2008 | Wang et al. |
| 2008/0165185 A1 | 7/2008 | Smith et al. |
| 2008/0165186 A1 | 7/2008 | Lin |
| 2008/0243749 A1 | 10/2008 | Pepper et al. |
| 2008/0294393 A1 | 11/2008 | Laake et al. |
| 2008/0306803 A1 | 12/2008 | Vaal et al. |
| 2009/0027380 A1 | 1/2009 | Rajan et al. |
| 2009/0027385 A1 | 1/2009 | Smith |
| 2009/0037114 A1 | 2/2009 | Peng et al. |
| 2009/0040224 A1 | 2/2009 | Igarashi et al. |
| 2009/0043507 A1 | 2/2009 | Dommisse et al. |
| 2009/0089028 A1 | 4/2009 | Sagert et al. |
| 2009/0122061 A1 | 5/2009 | Hammon, III |
| 2009/0125362 A1 | 5/2009 | Reid et al. |
| 2009/0157367 A1 | 6/2009 | Meyer et al. |
| 2009/0182541 A1 | 7/2009 | Crick et al. |
| 2009/0198447 A1 | 8/2009 | Legendre et al. |
| 2009/0205819 A1 | 8/2009 | Dale et al. |
| 2009/0222742 A1 | 9/2009 | Pelton et al. |
| 2009/0229819 A1 | 9/2009 | Repin et al. |
| 2009/0240564 A1 | 9/2009 | Boerries et al. |
| 2009/0295792 A1 | 12/2009 | Liu et al. |
| 2009/0299709 A1 | 12/2009 | Liu |
| 2009/0303233 A1 | 12/2009 | Lin et al. |
| 2010/0171740 A1 | 7/2010 | Andersen et al. |
| 2010/0172209 A1 | 7/2010 | Miller et al. |
| 2010/0191516 A1 | 7/2010 | Benish et al. |
| 2010/0206559 A1 | 8/2010 | Sequeira, Jr. et al. |
| 2010/0214870 A1 | 8/2010 | Pepper et al. |
| 2010/0225642 A1 | 9/2010 | Murray et al. |
| 2010/0283788 A1 | 11/2010 | Rothnemer et al. |
| 2011/0004447 A1 | 1/2011 | Hurley et al. |
| 2011/0029293 A1 | 2/2011 | Petty et al. |
| 2011/0044532 A1 | 2/2011 | Holl et al. |
| 2011/0054857 A1 | 3/2011 | Moguchaya |
| 2011/0060572 A1 | 3/2011 | Brown et al. |
| 2011/0063292 A1 | 3/2011 | Holl et al. |
| 2011/0074766 A1 | 3/2011 | Page et al. |
| 2011/0107246 A1 | 5/2011 | Vik |
| 2011/0112802 A1 | 5/2011 | Wilson et al. |
| 2011/0115787 A1 | 5/2011 | Kadlec |
| 2011/0153300 A1 | 6/2011 | Holl et al. |
| 2011/0161133 A1 | 6/2011 | Staveley et al. |
| 2012/0150449 A1 | 6/2012 | Dobin |
| 2012/0166166 A1 | 6/2012 | Czernuszenko |
| 2013/0112407 A1 | 5/2013 | Cheng et al. |
| 2013/0140037 A1 | 6/2013 | Sequeira, Jr. et al. |
| 2013/0298065 A1 | 11/2013 | Kurtenbach et al. |
| 2013/0317798 A1 | 11/2013 | Cheng et al. |
| 2013/0338984 A1 | 12/2013 | Braaksma et al. |
| 2013/0338987 A1 | 12/2013 | Cheng et al. |
| 2014/0160128 A1 | 6/2014 | Cheung et al. |
| 2014/0245211 A1 | 8/2014 | Gorell |
| 2014/0270393 A1 | 9/2014 | Louis et al. |
| 2014/0278117 A1 | 9/2014 | Dobin et al. |
| 2014/0365192 A1 | 12/2014 | Cheng et al. |
| 2015/0094994 A1 | 4/2015 | Sequeira, Jr. et al. |
| 2016/0003008 A1 | 1/2016 | Uribe et al. |
| 2016/0003956 A1 | 1/2016 | Walker et al. |

FOREIGN PATENT DOCUMENTS

| | | |
|---|---|---|
| EP | 1230566 | 11/2000 |
| WO | 00/14574 | 3/2000 |
| WO | 03/003053 | 1/2003 |
| WO | 03/072907 | 9/2003 |
| WO | 03/078794 | 9/2003 |
| WO | 2005/020044 | 3/2005 |
| WO | 2006/029121 | 3/2006 |
| WO | 2006/065915 | 6/2006 |
| WO | 2007/076044 | 7/2007 |
| WO | 2007/100703 | 9/2007 |
| WO | 2008/121950 | 10/2008 |
| WO | 2009/032416 | 3/2009 |
| WO | 2009/039422 | 3/2009 |
| WO | 2009/075946 | 6/2009 |
| WO | 2009/079160 | 6/2009 |
| WO | 2009/080711 | 7/2009 |
| WO | 2009/148681 | 12/2009 |
| WO | 2011/031369 | 3/2011 |
| WO | 2011/038221 | 3/2011 |
| WO | 2014/142976 | 9/2014 |

OTHER PUBLICATIONS

Patel, Daniel, et al. "Knowledge-assisted visualization of seismic data." Computers & Graphics 33.5 (2009): 585-596.*

Bharat, K, et al. (2001), "Who Links to Whom: Mining Linkage Between Web sites", *Proceedings of the 2001 IEE Int'l Conf on Data Mining*, pp. 51-58.

Cabral, B., et al (1995), "Accelerated Volume Rendering and Tomographic Reconstruction Using Texture Mapping Hardware", *IEEE in Symposium on Volume Visualization*, pp. 91-98, 131.

Crawfis, R., et al. (1992), "Direct Volume Visualization of Three-Dimensional Vector Fields", *Proceedings of the 1992 Workshop on Volume Visualization*, pp. 55-60.

Drebin, R., et al. (1988), "Volume Rendering",*Computer Graphics, the Proceedings of 1988 SIGGRAPH Conference*, vol. 22, No. 4, pp. 65-74.

Lorensen, W., et al., (1987), "Marching Cubes: A High-Resolution 3D Surface Construction Algorithm", *Computer Graphics, The Proceeding of 1987 SIGGRAPH Conference*, vol. 21, No. 4, pp. 163-169.

McCann, P., et al. (2003), "Horizontal Well Path Planning and Correction Using Optimization Techniques," *J. of Energy Resources Tech.* 123, pp. 187-193.

Mugerin. C., et al. (2002), "Well Design Optimization: Implementation in GOCAD," $22^{nd}$ Gocade Meeting, Jun. 2002.

Rainaud, J.F., et al. (2004), "WOG—Well Optimization by Geosteering: A Pilot Software for Cooperative Modeling on Internet," *Oil & Gas Science & Tech.* 59(4), pp. 427-445.

Reed, P., et al. (2003) "Simplifying Multiobjective Optimization Using Genetic Algorithms," Proceedings of World Water and Environmental Resources Congress, 10 pgs.

Udoh, E., et al. (2003), "Applicatons of Strategic Optimization Techniques to Development and Management of Oil and Gas Resources", $27^{th}$ SPE Meeting, 16 pgs.

Rohlf, J., et al., (2011), "IRIS Performer: A High Performance Multiprocessing Toolkit for Real-Time 3D Graphics", Silicon Graphics Computer Systems, 14 pages.

Holden, P., (1994), "VoxelGeo 1.1.1 Productivity Tool for the Geosciences", Vital Images, Inc., 92 pages.

* cited by examiner

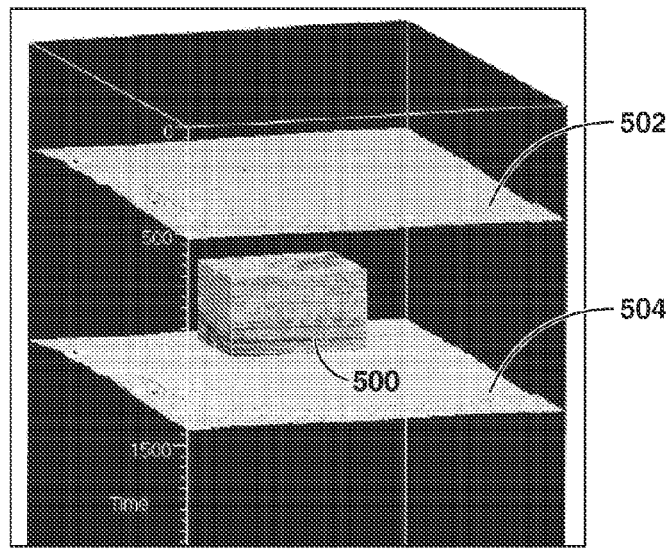
FIG. 5
*(Prior Art)*
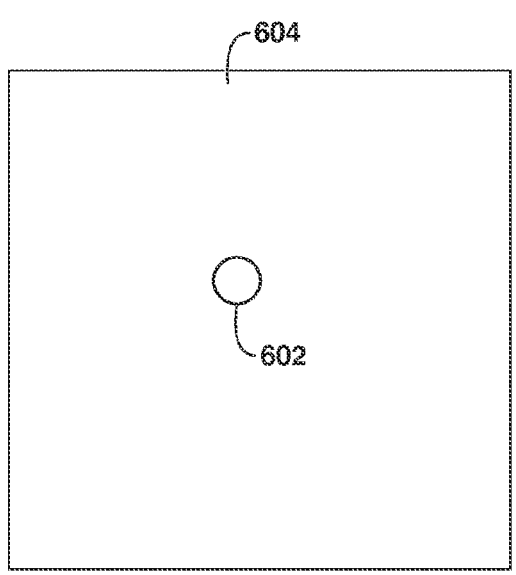 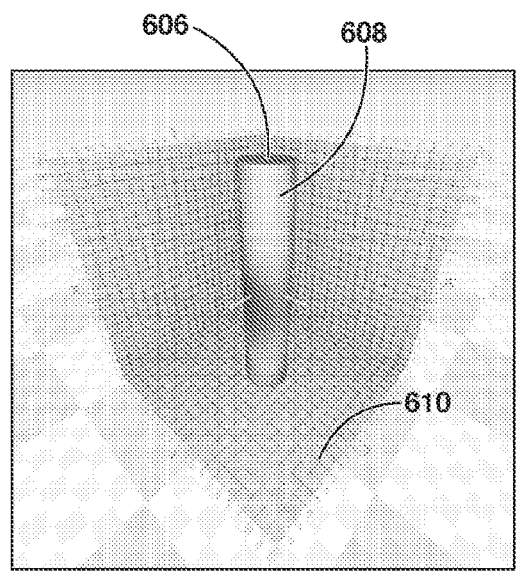
FIG. 6A  FIG. 6B

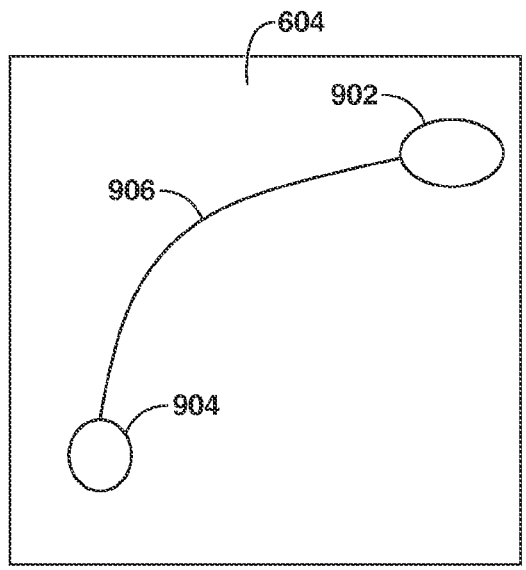
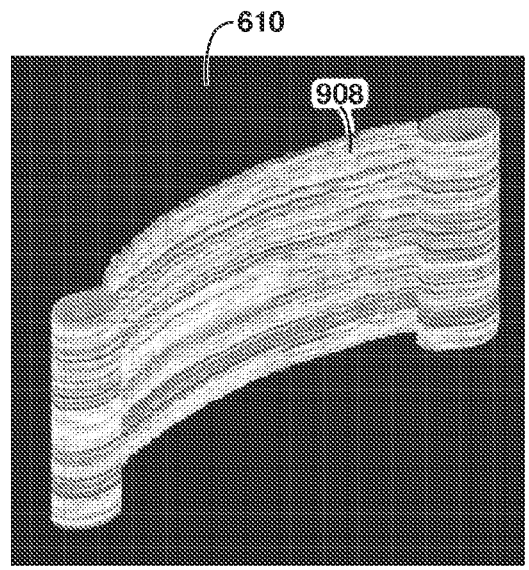
*FIG. 9A*  *FIG. 9B*
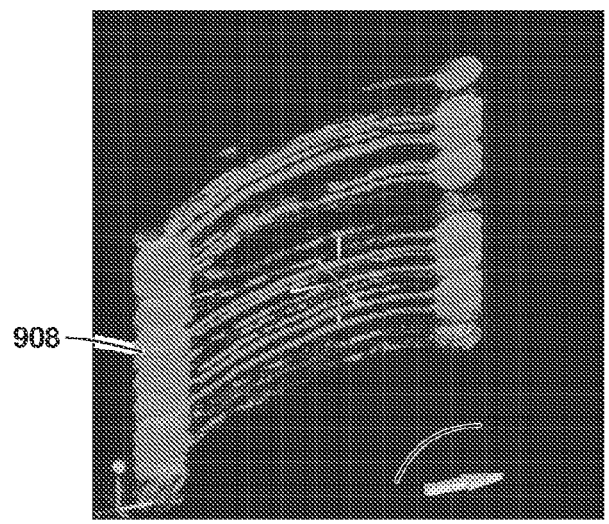
*FIG. 10*

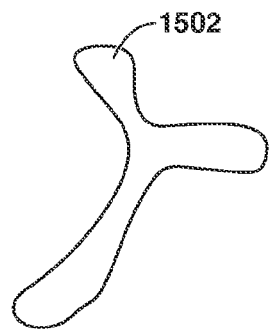
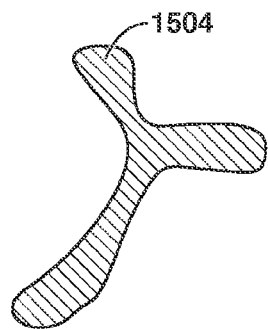
FIG. 15A          FIG. 15B
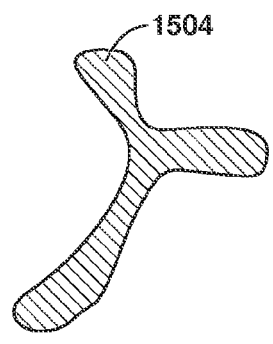
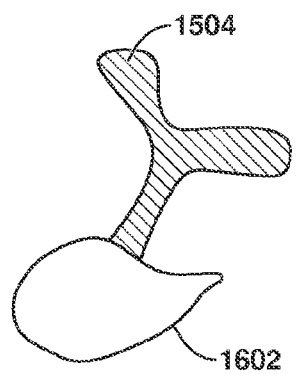
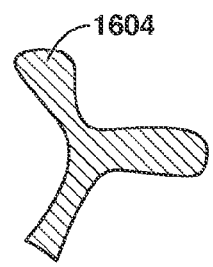
FIG. 16A          FIG. 16B          FIG. 16C

CANVAS CONTROL FOR 3D DATA VOLUME PROCESSING

CROSS-REFERENCE TO RELATED APPLICATION

This application is the National Stage entry under 35 U.S.C. 371 of PCT/US2013/035841, that published as Intl. Patent Application No. 2013/169429 and was filed on 9 Apr. 2013, which claims the benefit of U.S. Provisional Patent Application No. 61/644,196 filed May 8, 2012 entitled METHOD OF USING CANVAS BASED CONTROL FOR 3D DATA VOLUME VISUALIZATION, INTERROGATION, ANALYSIS AND PROCESSING, each of which is incorporated by reference herein, in its entirety, for all purposes.

FIELD

The present techniques relate to providing three-dimensional (3D) data and/or visualizations of data corresponding to physical objects and analysis thereof. In particular, an exemplary embodiment of the present techniques relates to providing visualizations, interrogation, analysis and processing of user-selected portions of a 3D data volume.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Volumetric (3D) model construction and visualization have been widely accepted by numerous disciplines as a mechanism for analyzing, communicating, and comprehending complex 3D datasets. Examples of structures that can be subjected to volumetric analysis include the earth's subsurface, facility designs and the human body. The ability to easily interrogate and explore 3D models is one aspect of 3D visualization. Relevant models may contain both 3D volumetric objects and co-located 3D polygonal objects. One example of a volumetric object is a seismic volume, shown in FIG. 1 at reference number 100. Other examples of volumetric objects are seismic volumes, MRI scans, reservoir simulation models, and geologic models. Interpreted horizons, faults and well trajectories are examples of polygonal objects. In some cases, there is a need to view the volumetric and polygonal objects concurrently to understand their geometric and property relations. If every cell of the 3D volumetric object is rendered fully opaque, as is the case with seismic volume 100 in FIG. 1, other objects in the scene may be occluded, and so it becomes advantageous at times to render such volumetric objects with transparency so that other objects may be seen through them. As an example, FIG. 2 depicts seismic volume 100 displayed with a degree of transparency. These 3D model interrogation and exploration tasks are useful during exploration, development and production phases in the oil and gas industry. Similar needs exist in other industries.

3D volumetric objects may be divided into two basic categories: those rendered using structured grids and those rendered using unstructured grids. Other types of grids may be defined on a spectrum between purely structured grids and purely unstructured grids. Both structured and unstructured grids may be rendered for a user to explore and understand the associated data. Known volume rendering techniques for structured grids render a full 3D volume with some degree of transparency, which enables the user to see through the volume. However, determining relations of 3D object properties is difficult, because it is hard to determine the exact location of semi-transparent data.

One way to view and interrogate a 3D volume is to render a cross-section through the 3D volume. The surface of the intersection between the cross-section and the 3-D volume may be rendered as a polygon with texture-mapped volume cell properties added thereto. For a structured grid rendered for a seismic or a medical scan, the user can create cross-sections along one of the primary directions: XY (inline or axial), XZ (cross-line or coronal) and YZ (time slice or sagittal). A traditional cross-section spans the extent of the object. In this case other objects such as horizons, wells or the like are partially or completely occluded and it is difficult to discern 3D relationships between objects. This effect is shown in FIG. 3, which is a 3D graph 300 of a subsurface region. The graph 300, which may provide a visualization of 3D data for a structured grid or an unstructured grid, shows a first cross-section 302, a second cross-section 304, a third cross-section 306, and a fourth cross-section 308. Each of the four cross-sections is chosen to allow a user to see data in a physical property model that comprises data representative of a property of interest. However, a first horizon 310 and a second horizon 312, as well as data displayed on cross-sections 302, 304 and 306 which also may be of interest to a user, are mostly obscured or occluded by the visualizations of the four cross-sections.

A ribbon section is one attempt to make traditional cross-sectional visual representations more flexible. One way to create a ribbon section is to extrude a line or polyline vertically through the volume, creating a curtain or ribbon, upon which surface the volumetric data from the intersection of the ribbon with the volume is painted. This concept of ribbon sections is depicted in FIG. 4, which is a 3D graph 400 of a subsurface region showing a ribbon section 402 defined by a polyline 404 comprising a first line segment 406 and a second line segment 408. Although ribbon section 402 is less intrusive than the cross-sections shown in FIG. 3, portions of a first horizon 410 and a second horizon 412 are still occluded as long as the ribbon section is displayed.

Another attempt to make traditional cross-sectional visual representations more flexible is to implement a three-dimensional probe within the data volume. This is demonstrated in FIG. 5, where a cube-shaped probe 500 is painted with volumetric data from the intersection of each of the probe's surfaces with the volume. Probe 500 may be moved around within the data volume. However, there are still instances in which horizons 502, 504 may be occluded.

All of the above methods rely on predefined geometric primitives like planes, combinations of planes, polylines, volumes, hexahedrons and others. These primitives are simple to understand, but they rarely match the geometry of a physical object. The above methods sometimes provide editing capabilities, like the ability to edit the polyline or change the orientation of the cross-section, so the user may better match the physical object. However, the editing tasks are time consuming and very often a perfect match cannot be obtained e.g. when a curved physical object is examined with a planar cross-section.

U.S. Patent Application Publication No. 2005/0231530 discloses a method for 3D object creation and editing based on 3D volumetric data via 2D drawing tools. In its operation, the user creates a 2D structure in the rendering space. These 2D structures, such as 2D points, 2D lines etc, are transformed/projected into 3D structure. This method relies on visualization of the 3D volumetric data as well as 2D interactions happening in the same rendering space. By doing this, the user's 2D operations are restricted by how the 3D data is visualized in rendering space. For example, their rendering of volumetric data uses planar slices (also known as cross-sections), and the 3D structures created by the 2D drawing tools will be collocated with these planar slices. To create a non planar 3D structure the user must perform digitization on numerous planar slices. For example, creating a cylinder requires drawing circles on a large number of 2D slices intersecting the cylinder. Another example involves creating a curved surface connecting two vertical wells. The method disclosed in the '530 Application requires a user to digitize lines on multiple time slices. What is needed is a method of rendering or displaying data using simple, intuitive editing commands while minimizing occlusion of data of interest.

SUMMARY

In one aspect, a method is disclosed for displaying selected portions of a three-dimensional (3D) volumetric data set representing a subsurface formation. At least one two-dimensional (2D) canvas is generated. The 2D canvas corresponds to a plane in the 3D data set. The 2D canvas is shown in a first display window. One or more primitives are created on the 2D canvas. A volumetric region of the 3D volumetric data set corresponding to the one or more primitives is identified. The volumetric region is displayed in a 3D scene. The 3D scene is shown in a second display window.

In another aspect, a system is disclosed for displaying selected portions of a three-dimensional (3D) volumetric data set representing a subsurface formation. The system includes a processor and a tangible, machine-readable storage medium that stores machine-readable instructions for execution by the processor. The machine-readable instructions include: code for generating at least one two-dimensional (2D) canvas, the 2D canvas corresponding to a plane in the 3D data set, the 2D canvas being shown in a first display window; code for creating one or more primitives on the 2D canvas; code for identifying a volumetric region of the 3D volumetric data set corresponding to the one or more primitives; and code for displaying the volumetric region in a 3D scene, the 3D scene being shown in a second display window.

In another aspect, a computer program product is provided having computer executable logic recorded on a tangible, machine readable medium. When executed the computer program product displays selected portions of a three-dimensional (3D) volumetric data set representing a subsurface formation. The computer program product includes: code for generating at least one two-dimensional (2D) canvas, the 2D canvas corresponding to a plane in the 3D data set, the 2D canvas being shown in a first display window; code for creating one or more primitives on the 2D canvas; code for identifying a volumetric region of the 3D volumetric data set corresponding to the one or more primitives; and code for displaying the volumetric region in a 3D scene, the 3D scene being shown in a second display window.

In still another aspect, a method of producing hydrocarbons is disclosed. According to the method, selected portions of a three-dimensional (3D) volumetric data set representing a subsurface hydrocarbon reservoir are displayed. The displaying includes generating at least one two-dimensional (2D) canvas. The 2D canvas corresponds to a plane in the 3D data set. The 2D canvas is shown in a first display window. One or more primitives are created on the 2D canvas. A volumetric region of the 3D volumetric data set corresponding to the one or more primitives is identified. The volumetric region is displayed in a 3D scene, which is shown in a second display window. Hydrocarbons are produced from the subsurface hydrocarbon reservoir using the displayed volumetric region.

BRIEF DESCRIPTION OF THE DRAWINGS

Advantages of the present techniques may become apparent upon reviewing the following detailed description and the accompanying drawings in which:

FIG. 5 is a perspective view of a visualization of volumetric data by rendering a probe or volume of interest according to known principles;

FIG. 6A is a display of a volume visualized in two dimensions according to disclosed aspects and methodologies;

FIG. 6B is a display of the volume of FIG. 6A visualized in three dimensions according to disclosed aspects and methodologies;

FIG. 9A is a display of geometric primitives according to disclosed aspects and methodologies;

FIG. 9B is a perspective view of a display of a 3D volume visualized based on the geometric primitives of FIG. 9A;

FIG. 10 is a perspective view of a display of a 3D volume visualized based on the geometric primitives of FIG. 9A, in which 3D visualization is performed with a semi-transparent color map according to disclosed aspects and methodologies;

FIGS. 15A and 15B are displays of a freehand drawing and fill operation on a 2D canvas according to disclosed methodologies and techniques;

FIGS. 16A, 16B and 16C are displays of an erase operation on a 2D canvas according to disclosed methodologies and techniques;

DETAILED DESCRIPTION

Figure 1:
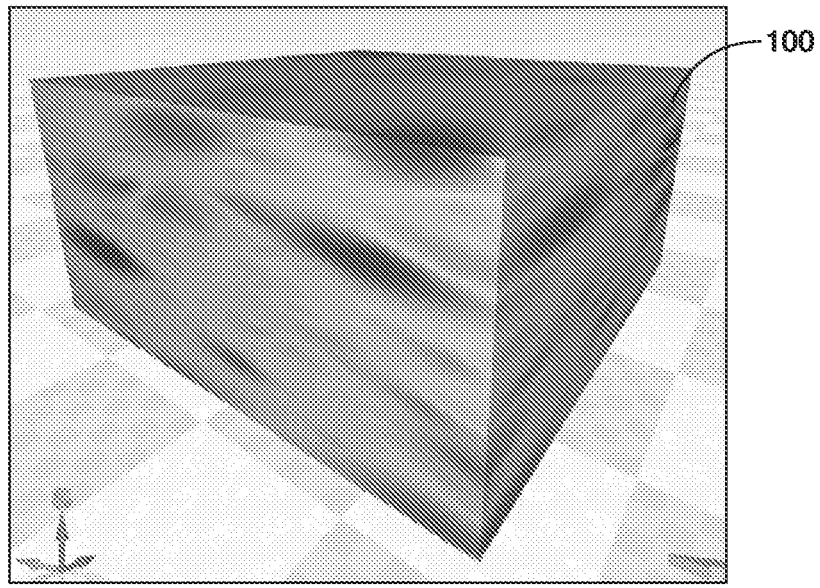
FIG. 1 is a perspective view of a visualization of volumetric data with an opaque color map according to known principles.
Figure 2:
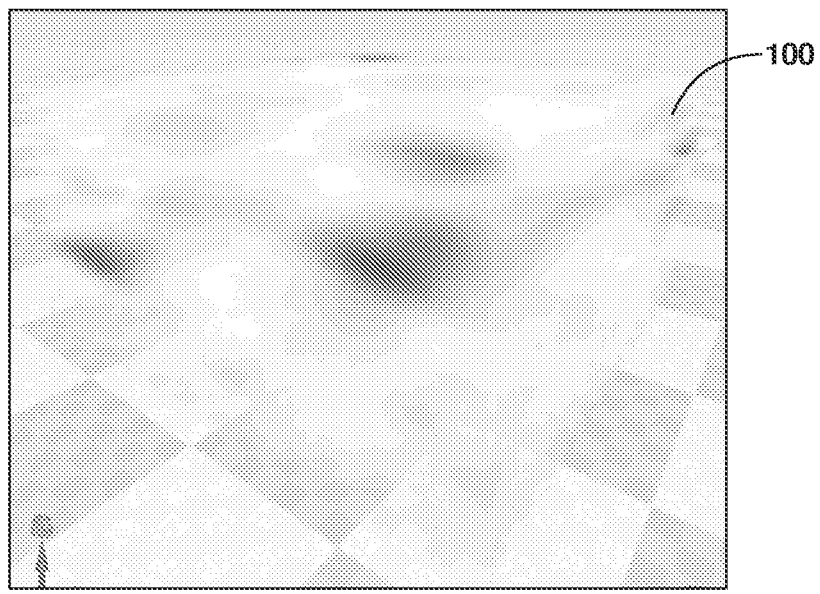
FIG. 2 is a perspective view of a visualization of volumetric data with a semi-transparent color map according to known principles.
Figure 3:
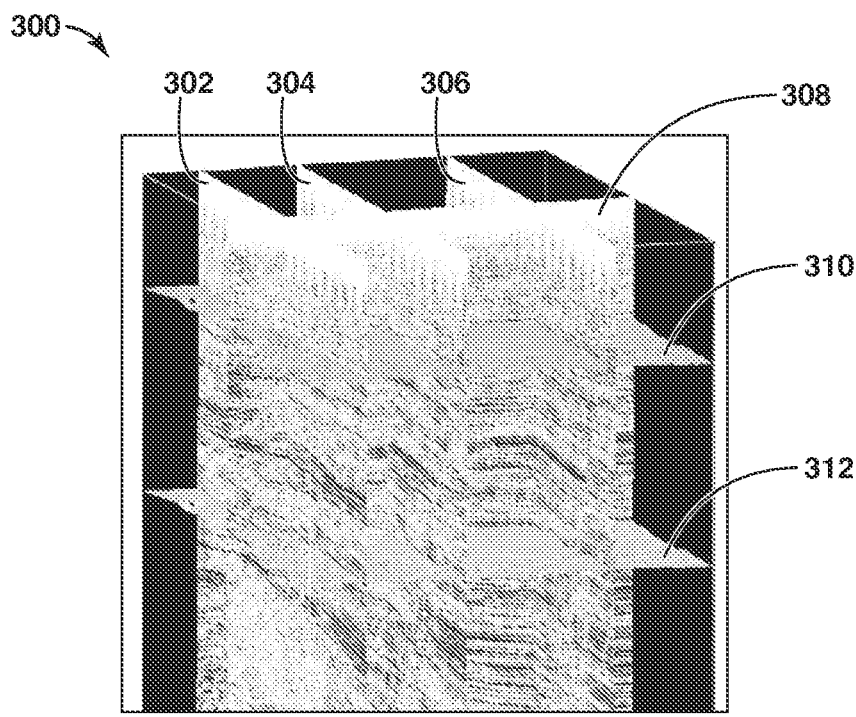
FIG. 3 is a perspective view of a visualization of volumetric data including cross-sections or planes according to known principles.
Figure 4:
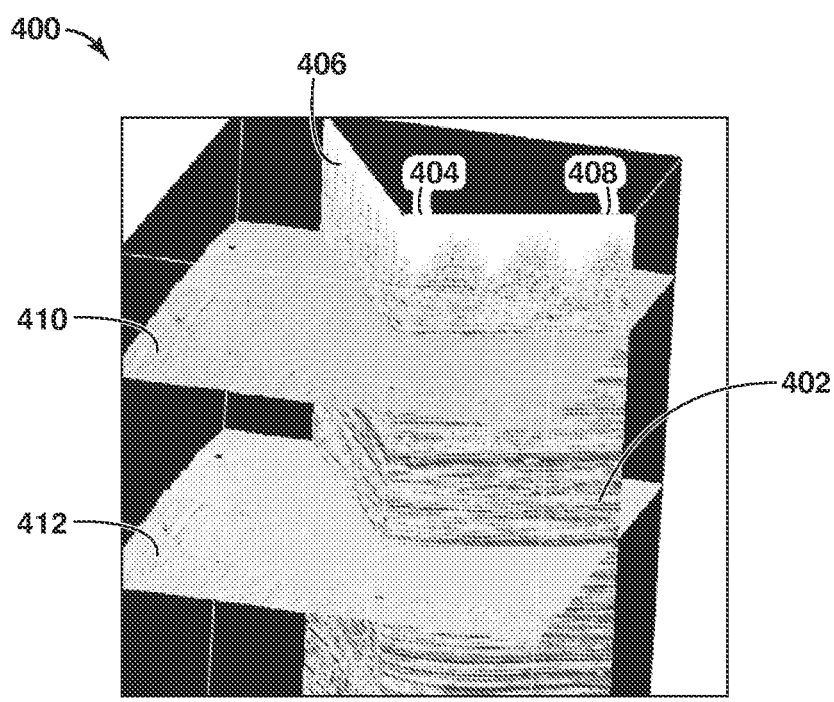
FIG. 4 is a perspective view of a visualization of volumetric data by rendering an arbitrary cross-section according to known principles.

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "3D seismic data volume" refers to a 3D data volume of discrete x-y-z or x-y-t data points, where x and y are not necessarily mutually orthogonal horizontal directions, z is the vertical direction, and t is two-way vertical seismic signal travel time. In subsurface models, these discrete data points are often represented by a set of contiguous hexahedrons known as cells or voxels. Each data point, cell, or voxel in a 3D seismic data volume typically has an assigned value ("data sample") of a specific seismic data attribute such as seismic amplitude, acoustic impedance, or any other seismic data attribute that can be defined on a point-by-point basis.

As used herein, the term "cell" refers to a closed volume formed by a collection of faces, or a collection of nodes that implicitly define faces.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and/or a computer. One or more computer components can reside within a process and/or thread of execution and a computer component can be localized on one computer and/or distributed between two or more computers.

As used herein, the terms "computer-readable medium" or "tangible machine-readable medium" refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

As used herein, the term "cross-section" refers to a plane that intersects a structured grid or an unstructured grid.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, the term "horizon" refers to a geologic boundary in the subsurface structures that are deemed important by an interpreter. Marking these boundaries is done by interpreters when interpreting seismic volumes by drawing lines on a seismic section. Each line represents the presence of an interpreted surface at that location. An interpretation project typically generates several dozen and sometimes hundreds of horizons. Horizons may be rendered using different colors to stand out in a 3D visualization of data.

As used herein, "hydrocarbon" includes any hydrocarbon substance, including for example one or more of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

As used herein, the term "I,J,K space" refers to an internal coordinate system for a geo-cellular model, having specified integer coordinates for (i,j,k) for consecutive cells. By convention, K represents a vertical coordinate. I,J,K space may be used as a sample space in which each coordinate represents a single sample value without reference to a physical characteristic.

As used herein, the term "3D plane" refers to a plane in three-dimensional (3D) space. This plane is typically defined by a point and a normal vector or by an equation $A*x+B*y+C*z+D=0$.

As used herein, the term "structured grid" refers to a matrix of volume data points known as voxels. Both the structured grid and the voxels have regular, defined geometries. Structured grids may be used with seismic data volumes.

As used herein, the term "unstructured grid" refers to a collection of cells with arbitrary geometries. Each cell can have the shape of a prism, hexahedron, or other more complex 3D geometries. When compared to structured grids, unstructured grids can better represent actual data since unstructured grids can contain finer (i.e. smaller) cells in one area with sudden changes in value of a property, and coarser (i.e. larger) cells elsewhere where the value of the property changes more slowly. Finer cells may also be used in areas having more accurate measurements or data certainty (for example, in the vicinity of a well). The flexibility to define cell geometry allows the unstructured grid to represent physical properties better than structured grids. In addition, unstructured grid cells can also better resemble the actual geometries of subsurface layers because cell shape is not restricted to a cube and may be given any orientation. However, all cell geometries need to be stored explicitly, thus an unstructured grid may require a substantial amount of memory. Unstructured grids may be employed in connection with reservoir simulation models. The term "unstructured grid" relates to how data is defined and does imply that the data itself has no structure. For example, one could represent a seismic model as an unstructured grid with explicitly defined nodes and cells. The result would necessarily be more memory intensive and inefficient to process and visualize than the corresponding structured definition.

As used herein, the term "voxel" refers to the smallest data point in a 3D volumetric object. Each voxel has unique set of coordinates and contains one or more data values that represent the properties at that location. Each voxel represents a discrete sampling of a 3D space, similar to the manner in which pixels represent sampling of the 2D space. The location of a voxel can be calculated by knowing the grid origin, unit vectors and the i,j,k indices of the voxel. As voxels are assumed to have similar geometries (such as cube-shaped), the details of the voxel geometries do not need to be stored, and thus structured grids require relatively little memory. However, dense sampling may be needed to capture small features, therefore increasing computer memory usage requirements.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "generating", "creating", "identifying", "displaying", "defining", "rendering", "predicting", or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

As set forth below, aspects of the disclosed techniques relate to an interactive visualization of selected portions of volumetric data sets. These volumetric data sets are visualized in a three-dimensional (3D) window. In addition to the 3D window, a user may interact using a separate two-dimensional (2D) canvas. This 2D canvas corresponds to a plane in the three-dimensional space represented in the 3D window. The user creates, edits or deletes 2D shapes on the 2D canvas. These shapes could be as simple as a circle, line segment or a hand drawn curve. Based on these 2D drawings a volume is created based on the 2D shape, and the volume is rendered in the 3D window. The portion of the volume intersecting the volumetric data set is identified or visualized in the 3D window.

Figure 7A:
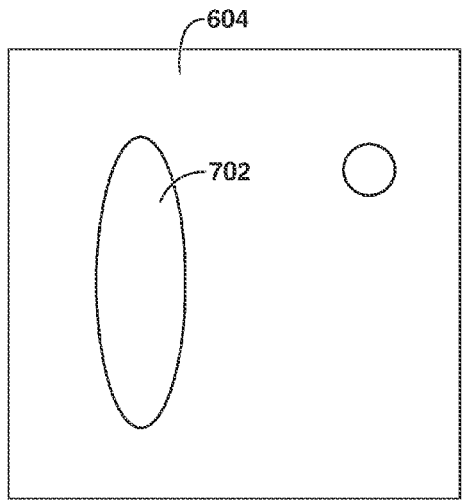
FIG. 7A is a display of geometric primitives on a 2D canvas according to disclosed aspects and methodologies.
Figure 7B:
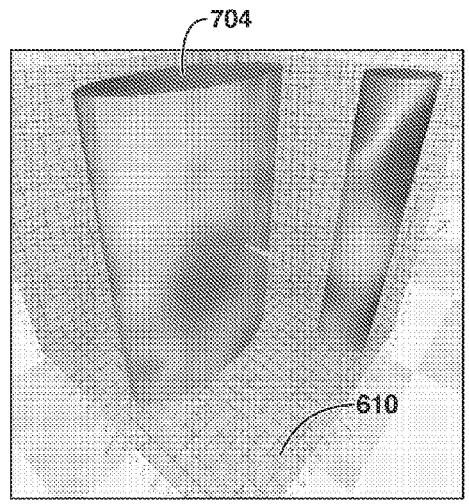
FIG. 7B is a display of volumes visualized based on the geometric primitives of FIG. 7A.

In an aspect, the 2D canvas corresponds to the top or map view of the 3D window. Shapes drawn on the 2D canvas are extruded vertically as shown in FIG. 6A, where a circle 602 drawn on the 2D canvas 604 corresponds to a cylinder 606 in a 3D window 608 in FIG. 6B. The portion of the volumetric data set intersected by the outer surface 608 of cylinder 606 is visualized in the 3D window 610. The portion of the volumetric data set outside cylinder 606 is not visualized. Alternatively, the portion of the volumetric data set outside the cylinder is visualized as transparent or semi-transparent. The user may further explore the volumetric data set by interacting with the 2D canvas. For example, the user may add another 2D primitive to the 2D canvas 604, such as an ellipse 702 in FIG. 7A. As shown in FIG. 7B, the visualization of the volumetric data set is updated to reflect the change on the 2D canvas by displaying an elliptical prism 704 in 3D window 610.

Figure 8A:
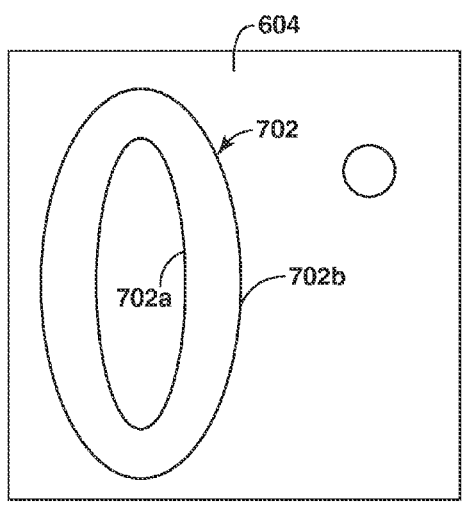
FIG. 8A is a display of geometric primitives on a 2D canvas in which the shape and/or size of one of the geometric primitives is modified according to disclosed aspects and methodologies.
Figure 8B:
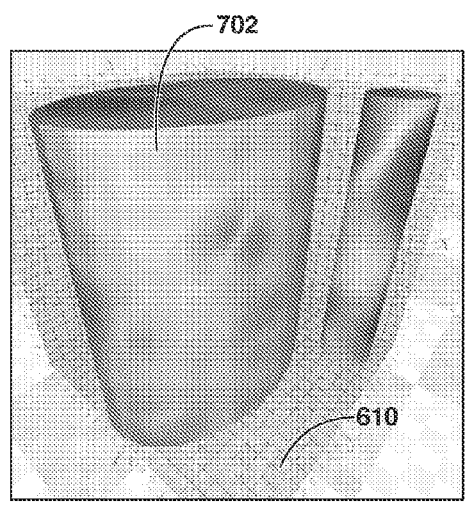
FIG. 8B is a display of volumes visualized based on the geometric primitives of FIG. 8A.

Another type of interaction is the editing of the 2D shapes. An example is illustrated in FIG. 8A, where the area enclosed by ellipse 702 is increased from area 702a to area 702b on 2D canvas 604. As shown in FIG. 8B, the volume of the elliptical prism is likewise increased as shown by reference number 802, and a corresponding portion of the volumetric data set is rendered in 3D window 610.

According to methodologies and techniques disclosed herein, a primitive geometric element may be entered on the 2D canvas by freehand drawing. FIG. 9A illustrates the result of a user creating two small ellipses 902, 904 on 2D canvas 604 and connecting them with a freehand drawn curve 906. A user can select different types of brushes as well as drawing styles for the free hand drawing. The portion 908 of the volumetric data set corresponding to the 2D drawing is rendered in 3D window 610, as shown in FIG. 9B.

The user can select different color maps for the rendering of the volumetric data set. FIGS. 9B and 10 are rendered in the 3D window from the same drawing on the 2D canvas, shown in FIG. 9A. However, the portion of the volumetric data set corresponding to the 2D drawing is rendered using a different color map in each figure: FIG. 9B uses a fully opaque color map and FIG. 10 uses a semi-transparent color map, as shown at 1000.

Figure 11A:
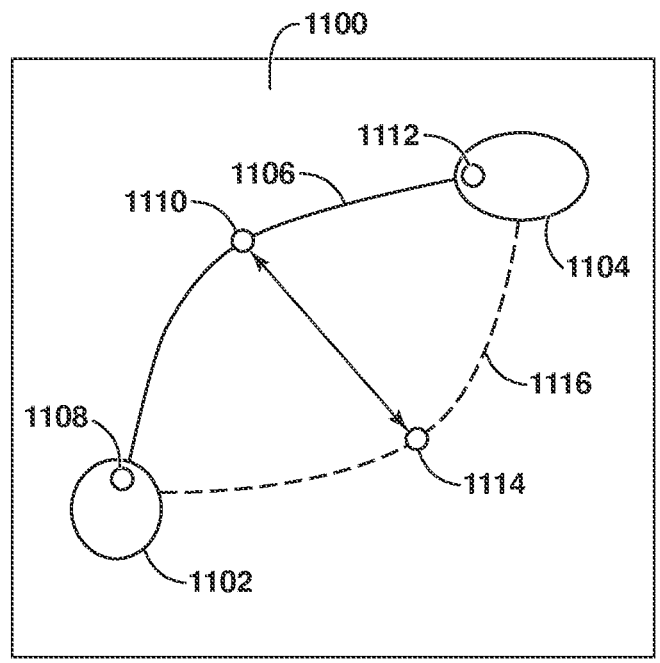
FIG. 11A is a display of geometric primitives according to disclosed aspects and methodologies.
Figure 11B:
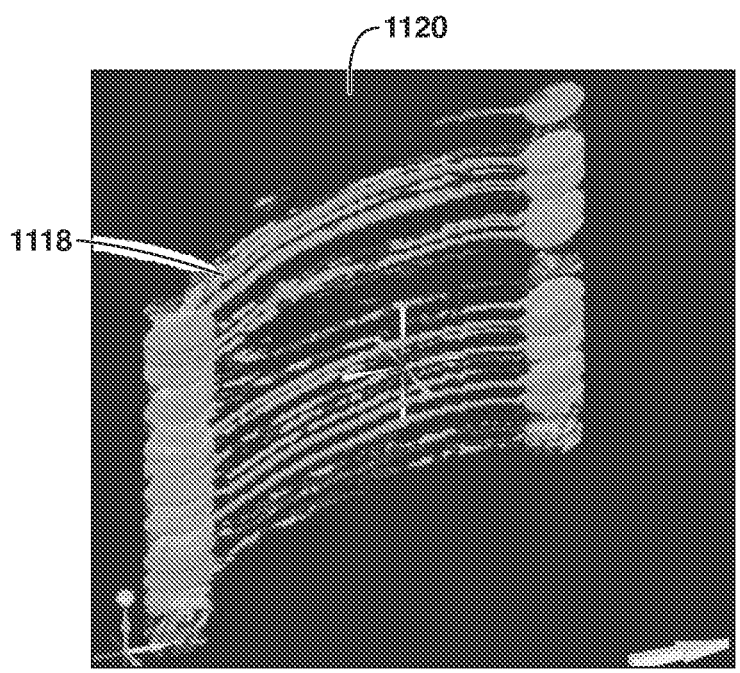
FIG. 11B is a perspective view of a 3D visualization, using a semi-transparent color map, of volumes corresponding to the geometric primitives of FIG. 11A according to disclosed methodologies and techniques.

FIG. 11 illustrates other 2D canvas editing capabilities. In this Figure the user has defined 2 ellipses 1102, 1104 on a 2D canvas 1100 and a curve 1106 connecting the ellipses. Curve 1106 has been created by defining 3 points represented as dots 1108, 1110, 1112. The user modifies the shape of the curve by moving the location of the middle point. Dot 1114 represents the new location of the middle point. By moving the middle point to location 1114, the user has changed the position of curve 1106 to the dashed line 1116. The portion 1118 of the volumetric object corresponding to the new shape on the 2D canvas is rendered in 3D window 1120 [FIG. 11B does not show the change to dashed line 1116 as shown in FIG. 11A.] using a semi-transparent color map.

The 2D canvas primitives can be either vector or raster primitives, similar to a generic 2D paint application. The raster primitives can be very easily converted into a 2D texture, but may have sampling or stair-stepping artefacts. A 2D vector primitive does not have these artefacts, and so a diagonal line in 2D would correspond to a perfectly diagonal line or plane in 3D.

Figure 12A:
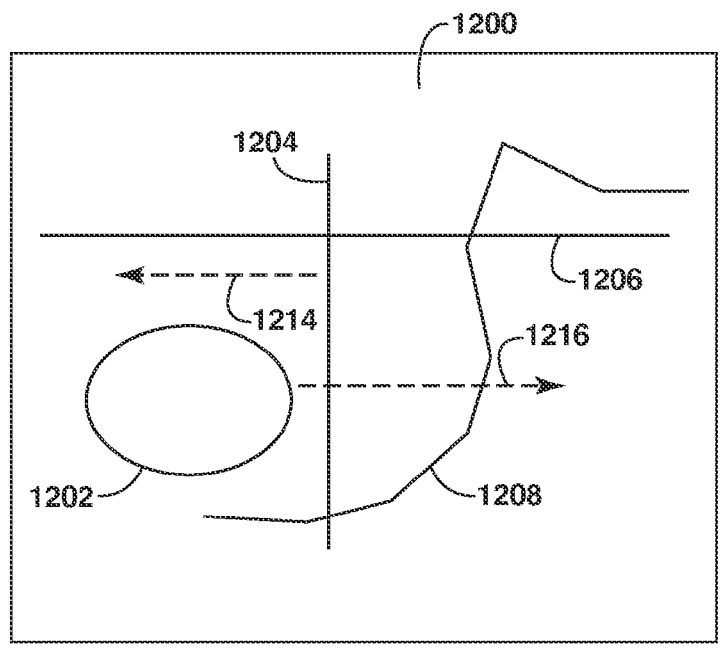
FIG. 12A is a display of geometric primitives according to disclosed aspects and methodologies.
Figure 12B:
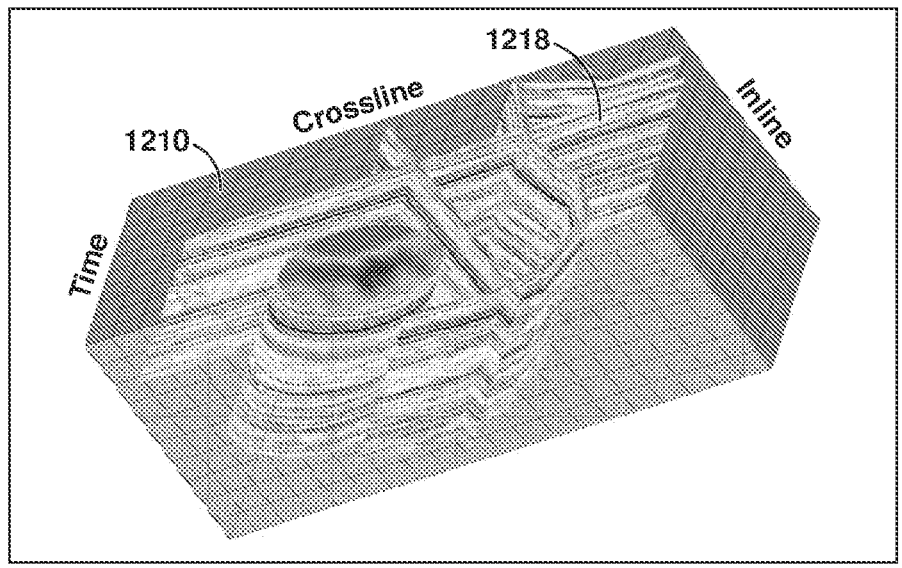
FIG. 12B is a perspective view of a 3D visualization of volumes corresponding to the geometric primitives of FIG. 12A according to disclosed methodologies and techniques.
Figure 13A:
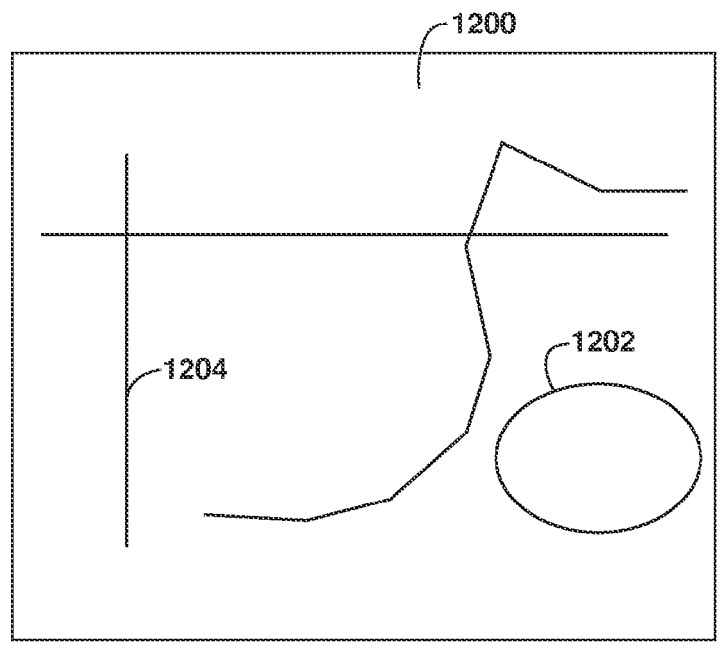
FIG. 13A is a display of geometric primitives according to disclosed aspects and methodologies.
Figure 13B:
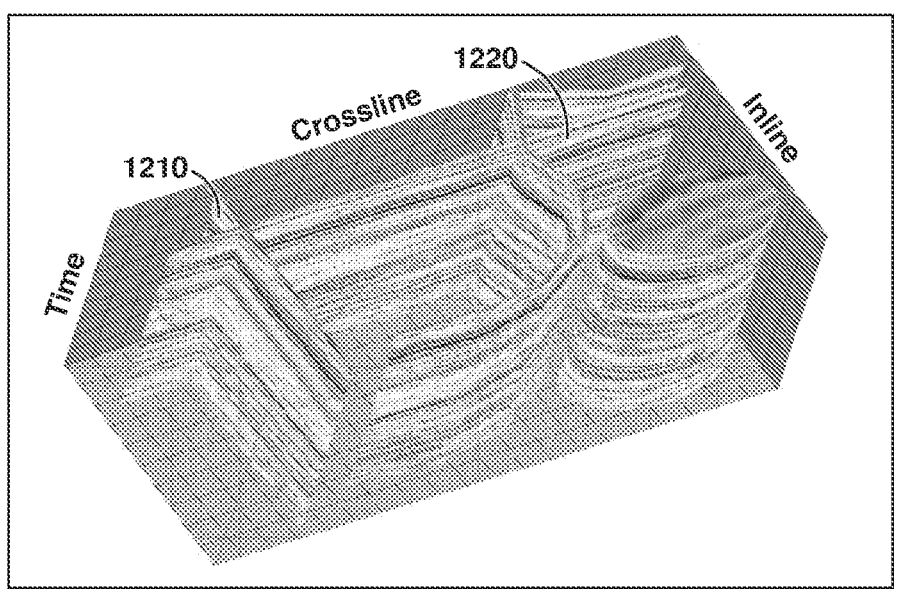
FIG. 13B is a perspective view of a 3D visualization of volumes corresponding to the geometric primitives of FIG. 13A according to disclosed methodologies and techniques.

FIGS. 12A and 12B illustrate more complex user interactions according to methodologies and techniques. FIG. 12A shows a 2D canvas 1200 upon which a user has generated or drawn several 2D primitives: an oval 1202, two line segments 1204, 1206, and a free-hand line 1208. As shown in 3D space 1210 in FIG. 12B, the portion 1220 of the volumetric object corresponding to the generated 2D primitives is rendered in 3D. The user may manipulate some or all of the 2D primitives after the initial creation thereof. As depicted in FIG. 13A, the user has moved oval 1202 and line segment 1204 on 2D canvas 1200 as demonstrated by arrows 1214, 1216 in 12A. FIG. 13B shows how such movement causes a new rendering 1220 of the portion of the volumetric object in 3D space 1210.

Figure 14A:
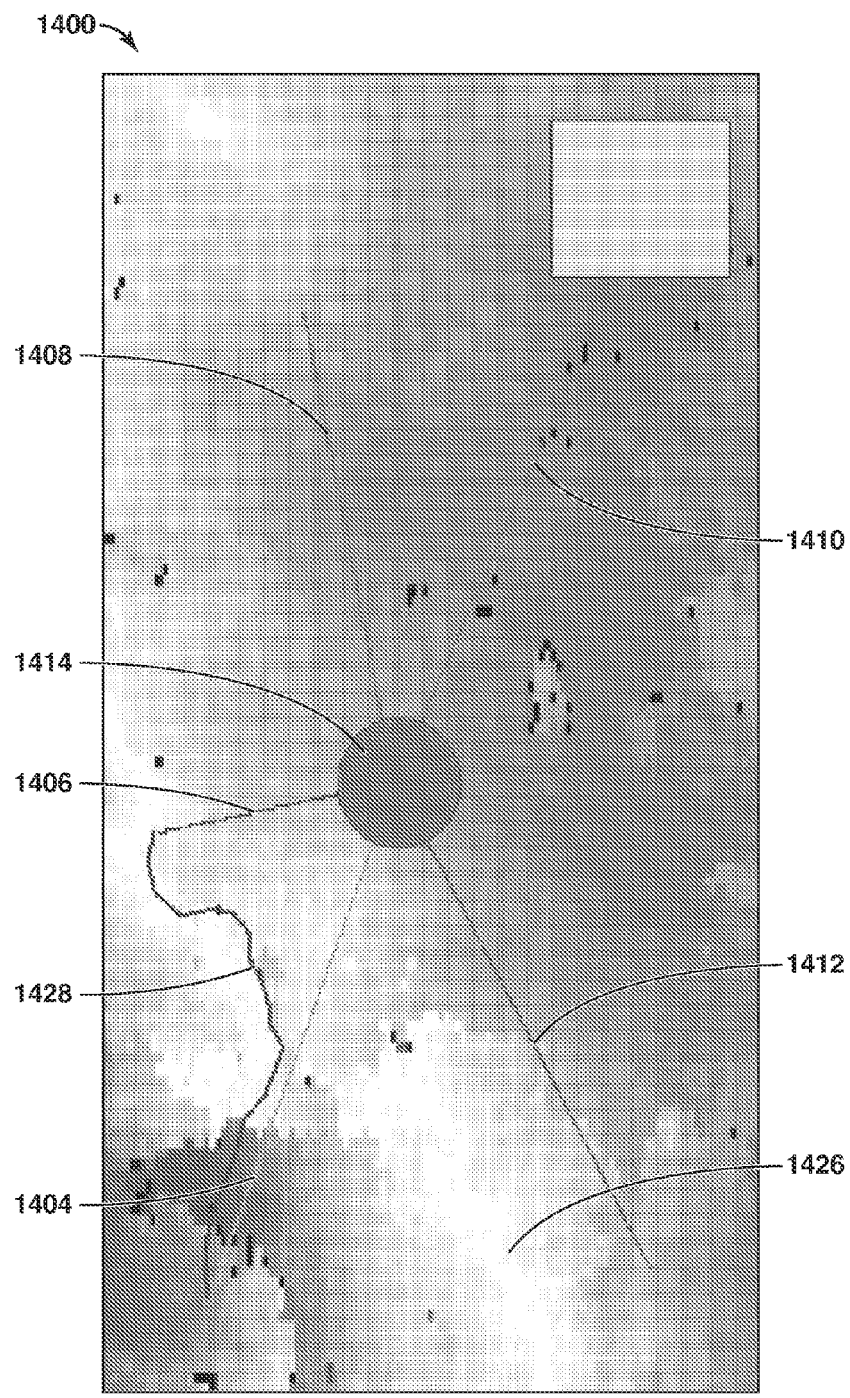
FIG. 14A is a display of geometric primitives corresponding to a drilling operation according to disclosed methodologies and techniques.
Figure 14B:
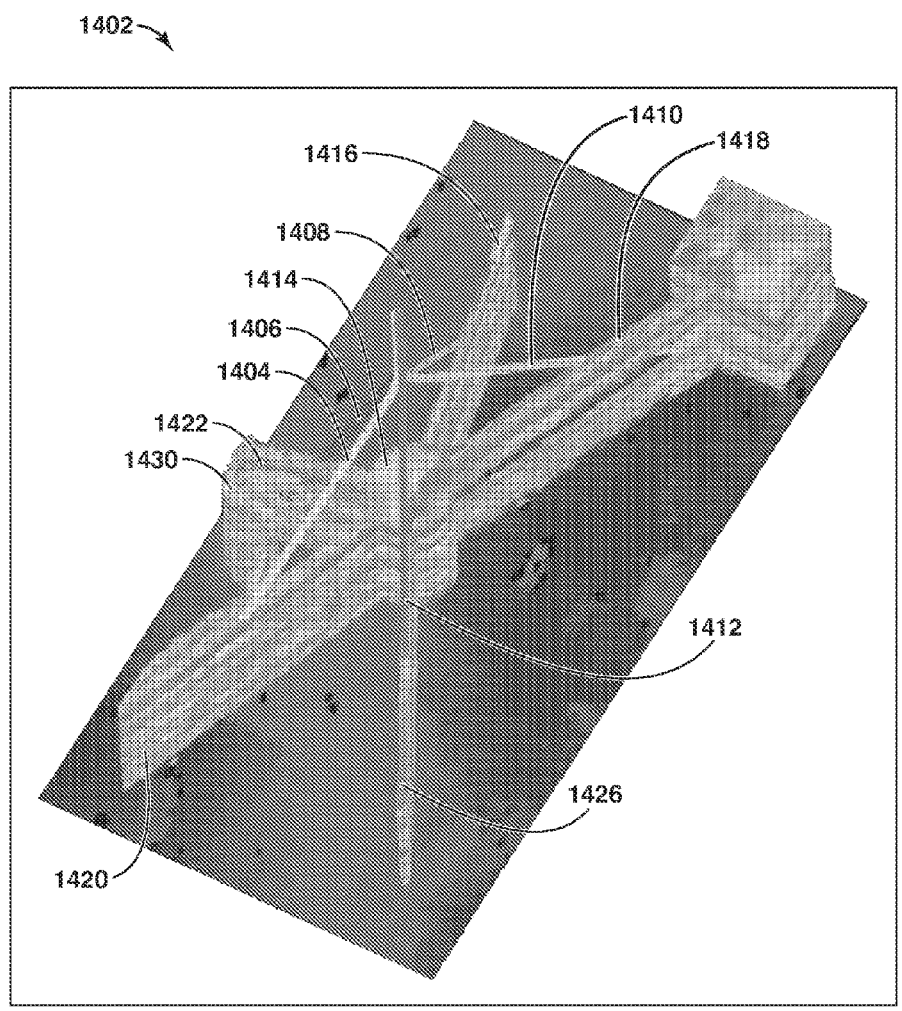
FIG. 14B is a perspective view of a 3D visualization of volumes corresponding to the geometric primitives of FIG. 13A according to disclosed methodologies and techniques.

The 2D canvas primitives may also be obtained from 3D geometric objects. For example, a well trajectory is a 3D path of a drilled well from a surface location to a target area of a reservoir. This path may be rendered in three-dimensional space and may also be converted or projected back onto the 2D canvas and a 2D primitive could be created. The user may then modify this 2D primitive and/or use the primitive as a reference for additional operations on the 2D canvas. FIGS. 14A and 14B illustrate this aspect of displaying subsurface data according to disclosed methodologies and techniques. A 2D canvas 1400 is shown in FIG. 14A, and the corresponding rendering in a 3D window 1402 is shown in FIG. 14B. In both Figures five well trajectories 1404, 1406, 1408, 1410, 1412 originate from a drill center 1414. These trajectories are rendered in 3D window 1402 as lines and are projected back into 2D canvas 1400, where they are also represented as lines. Seismic volume information corresponding to the vertical planes defined by each of the well trajectories is displayed only for a desired depth interval, as shown at 1416, 1418, 1420, 1422, and 1424. The desired depth interval may be limited by a horizon 1426. Seismic data for horizon depth 1426 is shown on 2D canvas as background contours or coloring. A user can control the display by controlling the properties of the lines in 2D. If the user desires to expand or widen the well traverse regions, the only needed operation is to alter the thickness of the lines on the 2D canvas. If a user desires to expand the amount of seismic data displayed in 3D window, the desired depth interval is modified.

These 2D primitives derived from 3D objects may serve as a location reference for additional operations on the 2D canvas. For example, a user studying possible connectivity between wells may draw a simple polyline 1428 connecting two wells 1404, 1406, as shown in FIG. 14A. Polyline 1428 may then be used to render a region of interest 1430 in 3D window 1402.

Various methods of extrusion may be used to create 3D objects from 2D primitives. A user may limit the amount of extrusion by either specifying an amount of extrusion or limiting the extrusion by providing a geometric limit e.g. surface, geologic horizon or fault. Alternatively, different types of operations may be applied to create the 3D portion of the volume. For example, the 2D primitive may be grown by a specific distance in 2 or 3 dimensions. As another example, the 2D primitive may be rotated in 3D to create the 3D portion. As yet another example, creating the 3D region/portion may involve performing Boolean operations on 3D regions created from multiple 2D canvases.

FIGS. 15A and 15B demonstrate another aspect of the disclosed methodologies and techniques. A geometric primitive 1502, rendered in 2D in FIG. 14A, may be changed to a solid 2D object 1504. The solid object 1504, shown again in FIG. 16A, may be the subject of an 'erase' operation 1602 (FIG. 16B) in 2D, thereby changing the shape of the object to that shown in FIG. 16C at 1604.

Figure 17:
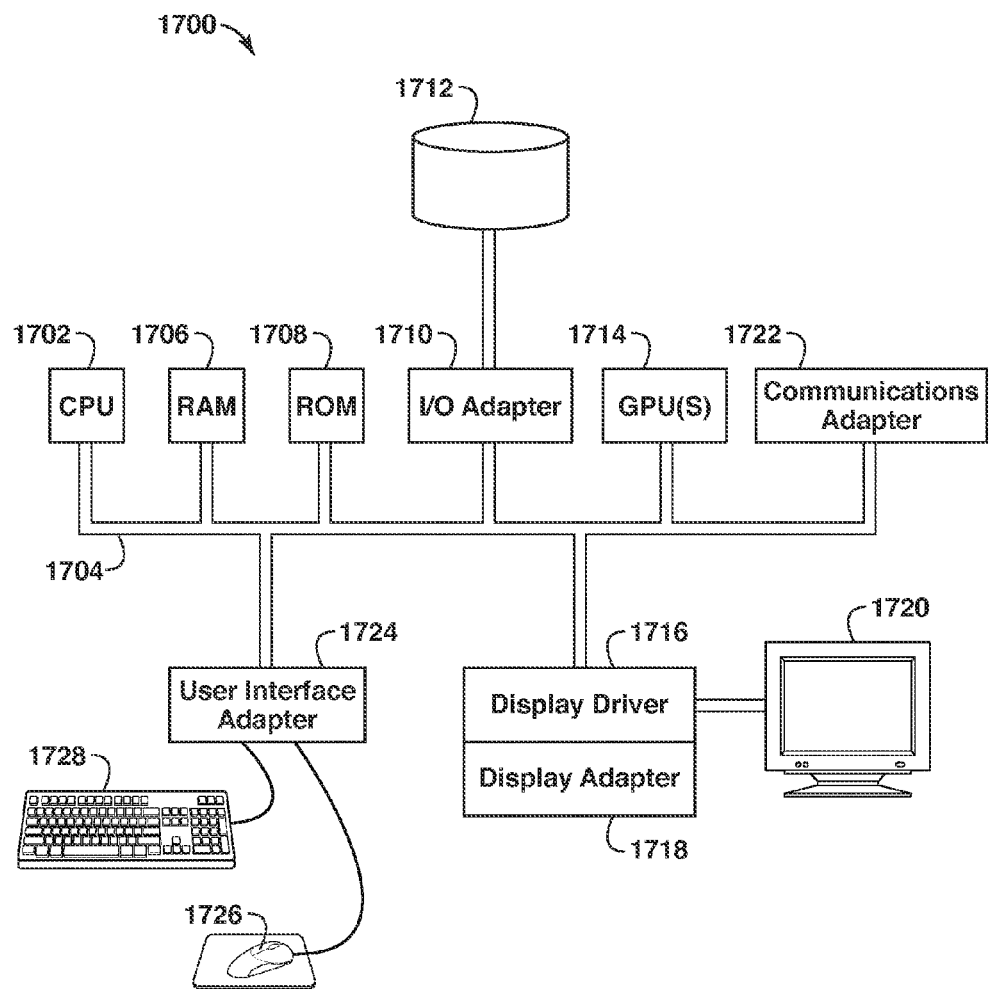
FIG. 17 is a block diagram of a computing system.

FIG. 17 is a block diagram of a computer system 1700 that may be used to perform any of the methods disclosed herein. A central processing unit (CPU) 1702 is coupled to system bus 1704. The CPU 1702 may be any general-purpose CPU, although other types of architectures of CPU 1702 (or other components of exemplary system 1700) may be used as long as CPU 1702 (and other components of system 1700) supports the inventive operations as described herein. The CPU 1702 may execute the various logical instructions according to disclosed aspects and methodologies. For example, the CPU 1702 may execute machine-level instructions for performing processing according to aspects and methodologies disclosed herein.

The computer system 1700 may also include computer components such as a random access memory (RAM) 1706, which may be SRAM, DRAM, SDRAM, or the like. The computer system 1700 may also include read-only memory (ROM) 1708, which may be PROM, EPROM, EEPROM, or the like. RAM 1706 and ROM 1708 hold user and system data and programs, as is known in the art. The computer system may also include one or more graphics processor units 1714, which may be used for various computational activities. The computer system 1700 may also include an input/output (I/O) adapter 1710, a communications adapter 1722, a user interface adapter 1724, and a display adapter 1718. The I/O adapter 1710, the user interface adapter 1724, and/or communications adapter 1722 may, in certain aspects and techniques, enable a user to interact with computer system 1700 in order to input information.

The I/O adapter 1710 preferably connects a storage device(s) 1712, such as one or more of hard drive, compact disc (CD) drive, floppy disk drive, tape drive, etc. to computer system 1700. The storage device(s) may be used when RAM 1706 is insufficient for the memory requirements associated with storing data for operations of embodiments of the present techniques. The data storage of the computer system 1700 may be used for storing information and/or other data used or generated as disclosed herein. The communications adapter 1722 may couple the computer system 1700 to a network (not shown), which may enable information to be input to and/or output from system 1700 via the network (for example, the Internet or other wide-area network, a local-area network, a public or private switched telephony network, a wireless network, any combination of the foregoing). User interface adapter 1724 couples user input devices, such as a keyboard 1728, a pointing device 1726, and the like, to computer system 1700. The display adapter 1718 is driven by the CPU 1702 to control, through a display driver 1716, the display on a display device 1720. Information and/or representations of one or more 2D canvases and one or more 3D windows may be displayed, according to disclosed aspects and methodologies.

The architecture of system 1700 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

Figure 18:
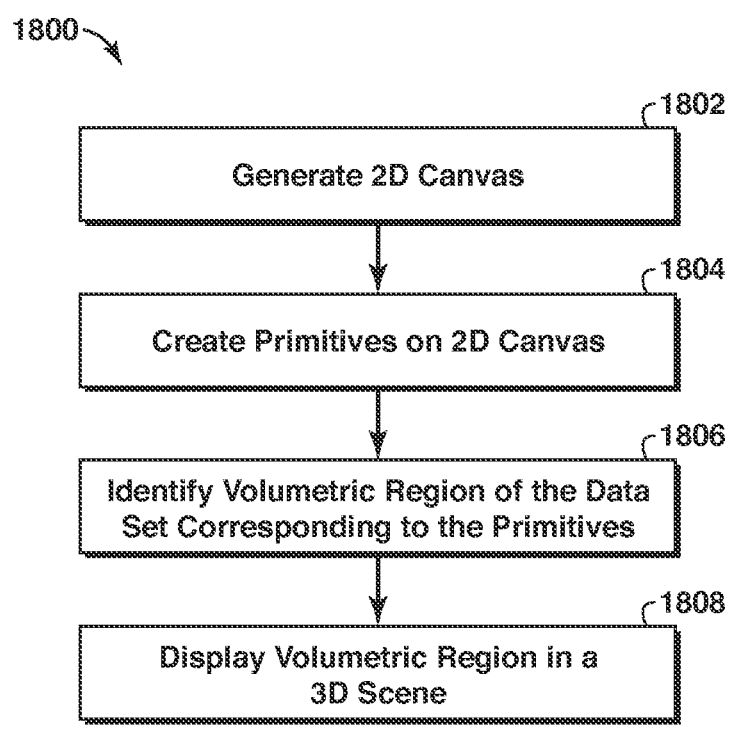
FIG. 18 is a flowchart of a method according to disclosed methodologies and techniques.

FIG. 18 depicts, in block form, a method 1800 for displaying selected portions of a three-dimensional (3D) volumetric data set according to aspects and methodologies disclosed herein. The volumetric data set may be 3D seismic, a structured reservoir model, an unstructured reservoir model, or a geologic model. At block 1802 at least one two-dimensional (2D) canvas is generated. The 2D canvas corresponds to a plane in the 3D data set. The 2D canvas is shown in a first display window. At block 1804 one or more primitives is created on the 2D canvas. The primitives may include one or more line drawings, point drawings, polygon drawings, raster primitives, and/or vector primitives. Creating the primitives may include brush paintings, fill operations, erase operations, and/or creating a primitive based on a 2D projection from an object in the 3D scene. At block 1806 a volumetric region of the 3D volumetric data set corresponding to the one or more primitives is identified. The volumetric region may be identified by creating a volume by performing an operation on the one or more primitives, and defining the volumetric region as an intersection of the created volume and the 3D volumetric data set. The operation may be extrude, grow, extrude with a geometric limit, or a geometric transformation such as a translation, a scale operation, or a rotation. Alternatively, the volumetric region may be identified based on a Boolean operation of at least two precursor volumetric regions. The volumetric region may be identified based on ray casting operations or virtual fragment operations on graphic processors. At block 1808 the volumetric region is displayed in a 3D scene. The 3D scene is shown in a second display window. The 3D scene may be shown based on the volumetric region. The 3D scene may be transparent where the volumetric region is transparent or opaque where the volumetric region is opaque. The 3D scene may be semi-transparent where the volumetric region is semi-transparent. A user may control the transparency of the 3D scene.

Figure 19:
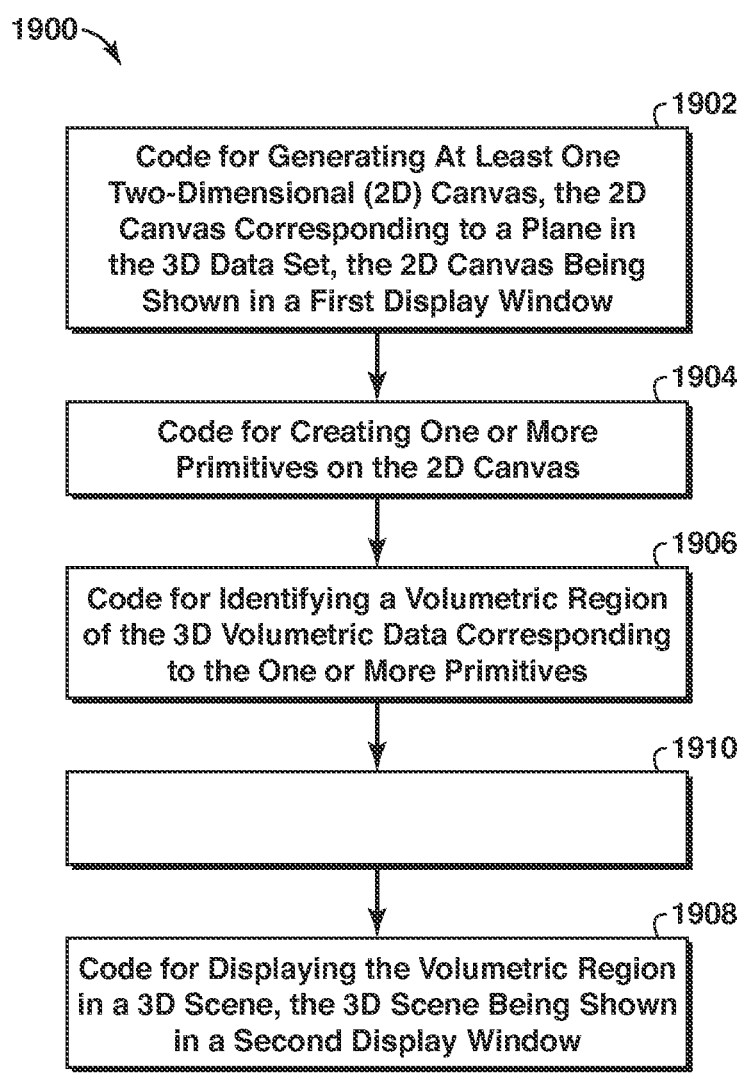
FIG. 19 is a block diagram representing computer code according to disclosed methodologies and techniques.

FIG. 19 shows a representation of machine-readable logic or code 1800 that when executed displays selected portions of a three-dimensional (3D) volumetric data set representing a subsurface formation. Code 1900 may be used or executed with a computing system such as computing system 1700. At block 1902 code is provided for generating at least one two-dimensional (2D) canvas, the 2D canvas corresponding to a plane in the 3D data set, the 2D canvas being shown in a first display window. At block 1904 code is provided for creating one or more primitives on the 2D canvas. At block 1906 code is provided for identifying a volumetric region of the 3D volumetric data set corresponding to the one or more primitives. At block 1908 code is provided for displaying the volumetric region in a 3D scene, the 3D scene being shown in a second display window. Code effectuating or executing other features of the disclosed aspects and methodologies may be provided as well. This additional code is represented in FIG. 19 as block 1910, and may be placed at any location within code 1900 according to computer code programming techniques.

Figure 20:
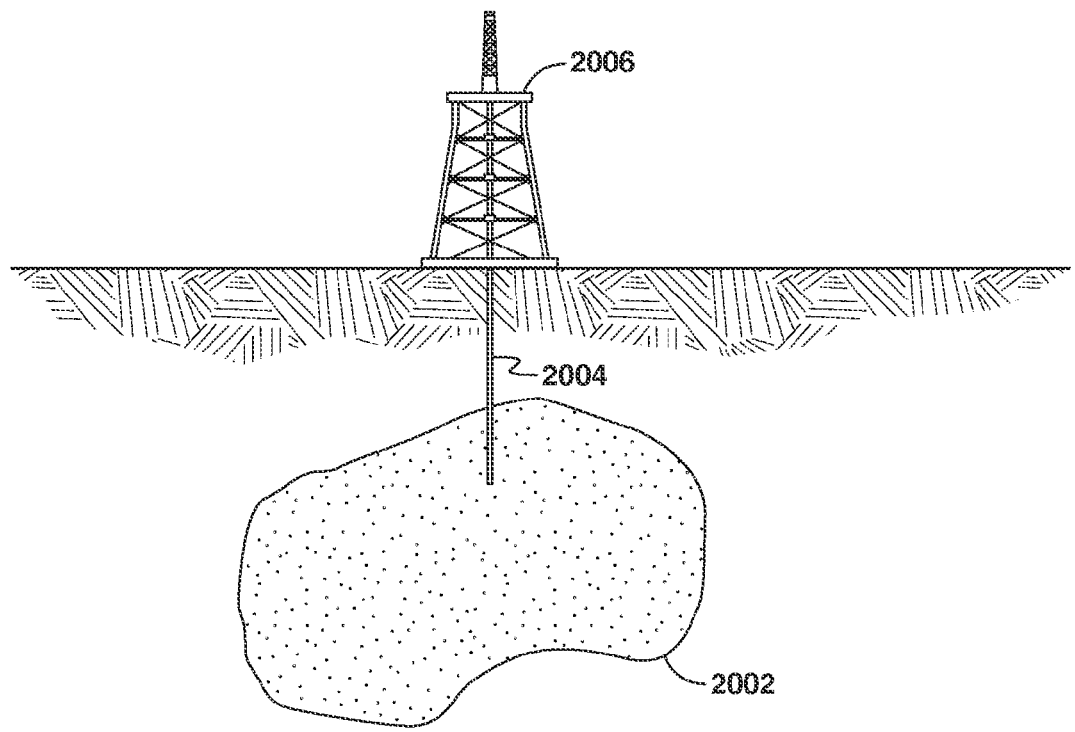
FIG. 20 is a side elevational view of a hydrocarbon reservoir.
Figure 21:
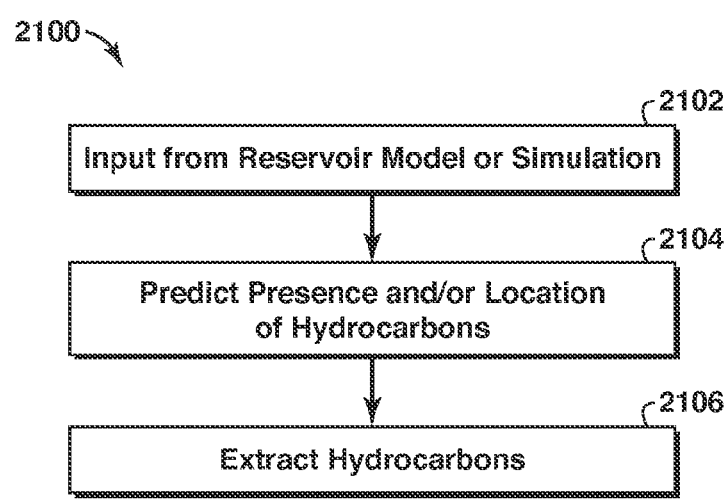
FIG. 21 is a flowchart of a method according to disclosed methodologies and techniques.

Aspects disclosed herein may be used to perform hydrocarbon management activities such as extracting hydrocarbons from a subsurface formation, region, or reservoir, which is indicated by reference number 2002 in FIG. 20. A method 2100 of extracting hydrocarbons from subsurface reservoir 2002 is shown in FIG. 21. At block 2102 inputs are received from a numerical model, geologic model, or flow simulation of the subsurface region, where the model or simulation has been run or improved using the methods and aspects disclosed herein. At block 2104 the presence and/or location of hydrocarbons in the subsurface region is predicted. At block 2106 hydrocarbon extraction is conducted to remove hydrocarbons from the subsurface region, which may be accomplished by drilling a well 2004 using oil drilling equipment 2006 (FIG. 20). Other hydrocarbon management activities may be performed according to known principles.

Illustrative, non-exclusive examples of methods and products according to the present disclosure are presented in the following non-enumerated paragraphs. It is within the scope of the present disclosure that an individual step of a method recited herein, including in the following enumerated paragraphs, may additionally or alternatively be referred to as a "step for" performing the recited action.

A. A method for displaying selected portions of a three-dimensional (3D) volumetric data set representing a subsurface formation, comprising:

generating at least one two-dimensional (2D) canvas, the 2D canvas corresponding to a plane in the 3D data set, the 2D canvas being shown in a first display window;

creating one or more primitives on the 2D canvas;

identifying a volumetric region of the 3D volumetric data set corresponding to the one or more primitives; and displaying the volumetric region in a 3D scene, the 3D scene being shown in a second display window.

A1. The method according to paragraph A, wherein the volumetric data set is one of a 3D seismic, a structured reservoir model, an unstructured reservoir model, and a geologic model.

A2. The method according to any of paragraphs A-A1, wherein the one or more primitives includes at least one of a line drawing, a point drawing, and a polygon drawing.

A3. The method according to any of paragraphs A-A2, wherein creating one or more primitives includes at least one of a brush painting, a fill operation, and an erase operation.

A4. The method according to any of paragraphs A-A3, wherein creating one or more primitives includes creating a primitive based on a 2D projection from an object in the 3D scene.

A5. The method according to any of paragraphs A-A4, wherein each of the one or more primitives is a raster primitive.

A6. The method according to any of paragraphs A-A5, wherein each of the one or more primitives is a vector primitive.

A7. The method according to any of paragraphs A-A6, wherein the volumetric region is identified by creating a volume by performing an operation on the one or more primitives, and defining the volumetric region as an intersection of the created volume and the 3D volumetric data set.

A8. The method according to paragraph A7, wherein the operation comprises one of extrude and grow.

A9. The method according to paragraph A7, wherein the operation comprises extrude with a geometric limit.

A10. The method according to paragraph A7, wherein the operation comprises a geometric transformation.

A11. The method according to paragraph A10, wherein the transformation is one of a translation, a scale operation, or a rotation.

A12. The method according to any of paragraphs A-A11, wherein the volumetric region is identified based on a Boolean operation of at least two precursor volumetric regions.

A13. The method according to any of paragraphs A-A12, wherein the 2D canvas is a first 2D canvas, and further wherein the volumetric region is identified based on a Boolean operation on 3D regions identified by the first 2D canvas and a second 2D canvas.

A14. The method according to any of paragraphs A-A13, wherein the volumetric region is identified based on ray casting operations on graphic processors.

A15. The method according to any of paragraphs A-A14, wherein the volumetric region is identified based on virtual fragment operations on graphic processors.

A16. The method according to any of paragraphs A-A15, wherein the 3D scene is rendered based on the volumetric region.

A17. The method according to any of paragraphs A-A16, wherein the 3D scene is transparent where the volumetric region is transparent.

A18. The method according to any of paragraphs A-A17, wherein the 3D scene is opaque where the volumetric region is opaque.

A19. The method according to any of paragraphs A-A18, wherein the 3D scene is semi-transparent where the volumetric region is semi-transparent.

A20. The method according to any of paragraphs A-A19, wherein a user can control transparency of the 3D scene.

A21. The method according to any of paragraphs A-A20, further comprising:

predicting at least one of a presence, location, and amount of hydrocarbons in the subsurface formation; and managing hydrocarbons in the subsurface formation based on said prediction.

B. A system for displaying selected portions of a three-dimensional (3D) volumetric data set representing a subsurface formation, the system comprising:

a processor;

a tangible, machine-readable storage medium that stores machine-readable instructions for execution by the processor, wherein the machine-readable instructions include code for generating at least one two-dimensional (2D) canvas, the 2D canvas corresponding to a plane in the 3D data set, the 2D canvas being shown in a first display window, code for creating one or more primitives on the 2D canvas, code for identifying a volumetric region of the 3D volumetric data set corresponding to the one or more primitives, and code for displaying the volumetric region in a 3D scene, the 3D scene being shown in a second display window.

C. A computer program product having computer executable logic recorded on a tangible, machine readable medium, the computer program product when executed displays selected portions of a three-dimensional (3D) volumetric data set representing a subsurface formation, the computer program product comprising:

code for generating at least one two-dimensional (2D) canvas, the 2D canvas corresponding to a plane in the 3D data set, the 2D canvas being shown in a first display window, code for creating one or more primitives on the 2D canvas, code for identifying a volumetric region of the 3D volumetric data set corresponding to the one or more primitives, and code for displaying the volumetric region in a 3D scene, the 3D scene being shown in a second display window.

D. A method of producing hydrocarbons, comprising:

displaying selected portions of a three-dimensional (3D) volumetric data set representing a subsurface hydrocarbon reservoir, wherein the displaying includes generating at least one two-dimensional (2D) canvas, the 2D canvas corresponding to a plane in the 3D data set, the 2D canvas being shown in a first display window, creating one or more primitives on the 2D canvas, identifying a volumetric region of the 3D volumetric data set corresponding to the one or more primitives, and displaying the volumetric region in a 3D scene, the 3D scene being shown in a second display window; and producing hydrocarbons from the subsurface hydrocarbon reservoir using the displayed volumetric region.

What is claimed is:

1. A method for displaying selected portions of a three-dimensional (3D) volumetric data set representing a subsurface formation, comprising:
   generating at least one two-dimensional (2D) canvas, the 2D canvas corresponding to a plane in the 3D data set, the 2D canvas being shown in a first display window;
   creating one or more 2D primitives on the 2D canvas;
   creating a 3D volume from the one or more 2D primitives created on the 2D canvas;
   forming a volumetric region, which is a subset of the 3D volumetric data set, from an intersection between the 3D volume created from the one or more 2D primitives and the 3D volumetric data set; and
   displaying the volumetric region in a 3D scene, the 3D scene being shown in a second display window.

2. The method of claim 1, wherein the volumetric data set is one of a 3D seismic, a structured reservoir model, an unstructured reservoir model, and a geologic model.

3. The method of claim 1, wherein the one or more 2D primitives includes at least one of a line drawing, a point drawing, and a polygon drawing.

4. The method of claim 1, wherein creating one or more 2D primitives includes at least one of a brush painting, a fill operation, and an erase operation.

5. The method of claim 1, wherein creating one or more 2D primitives includes creating a primitive based on a 2D projection from an object in the 3D scene.

6. The method of claim 1, wherein each of the one or more 2D primitives is a raster primitive.

7. The method of claim 1, wherein each of the one or more 2D primitives is a vector primitive.

8. The method of claim 1, wherein the 2D canvas is a top or map view of the second display window, the second display window is separate from and adjacent to the first display window, the second display window is a 3D window and the first display window is a 2D window.

9. The method of claim 1, wherein the creating the 3D volume comprises performing an extrude operation or a grow operation.

10. The method of claim 9, wherein the extrude operation is performed with a geometric limit.

11. The method of claim 1, wherein the creating the 3D volume comprises performing a geometric transformation.

12. The method of claim 11, wherein the transformation is one of a translation, a scale operation, or a rotation.

13. The method of claim 1, wherein the volumetric region is identified based on a Boolean operation of at least two precursor volumetric regions.

14. The method of claim 1, wherein the 2D canvas is a first 2D canvas, and further wherein the volumetric region is identified based on a Boolean operation on 3D regions identified by the first 2D canvas and a second 2D canvas.

15. The method of claim 1, wherein the volumetric region is identified based on ray casting operations on graphic processors.

16. The method of claim 1, wherein the volumetric region is identified based on virtual fragment operations on graphic processors.

17. The method of claim 1, wherein the 3D scene is shown based on the volumetric region.

18. The method of claim 1, wherein the 3D scene is transparent where the volumetric region is transparent.

19. The method of claim 1, wherein the 3D scene is opaque where the volumetric region is opaque.

20. The method of claim 1, wherein the 3D scene is semi-transparent where the volumetric region is semi-transparent.

21. The method of claim 1, wherein a user can control transparency of the 3D scene.

22. The method of claim 1, further comprising:
   predicting at least one of a presence, location, and amount of hydrocarbons in the subsurface formation based on the volumetric region; and
   managing hydrocarbons in the subsurface formation based on said prediction.

23. A system for displaying selected portions of a three-dimensional (3D) volumetric data set representing a subsurface formation, the system comprising:
   a processor;
   a tangible, machine-readable storage medium that stores machine-readable instructions for execution by the processor, wherein the machine-readable instructions include
   code for generating at least one two-dimensional (2D) canvas, the 2D canvas corresponding to a plane in the 3D data set, the 2D canvas being shown in a first display window,
   code for creating one or more 2D primitives on the 2D canvas,
   code for creating a 3D volume from the one or more 2D primitives created on the 2D canvas,
   code for forming a volumetric region, which is a subset of the 3D volumetric data set, from an intersection between the 3D volume created from the one or more 2D primitives and the 3D volumetric data set, and
   code for displaying the volumetric region in a 3D scene, the 3D scene being shown in a second display window.

24. A computer program product having computer executable logic recorded on a tangible, machine readable non-transitory medium, the computer program product when executed displays selected portions of a three-dimensional (3D) volumetric data set representing a subsurface formation, the computer program product comprising:
   code for generating at least one two-dimensional (2D) canvas, the 2D canvas corresponding to a plane in the 3D data set, the 2D canvas being shown in a first display window,
   code for creating one or more 2D primitives on the 2D canvas,
   code for creating a 3D volume from the one or more 2D primitives created on the 2D canvas, code for forming a volumetric region, which is a subset of the 3D volumetric data set, from an intersection between the 3D volume created from the one or more 2D primitives and the 3D volumetric data set, and code for displaying the volumetric region in a 3D scene, the 3D scene being shown in a second display window.

25. A method of producing hydrocarbons, comprising:

displaying selected portions of a three-dimensional (3D) volumetric data set representing a subsurface hydrocarbon reservoir, wherein the displaying includes generating at least one two-dimensional (2D) canvas, the 2D canvas corresponding to a plane in the 3D data set, the 2D canvas being shown in a first display window, creating one or more 2D primitives on the 2D canvas, creating a 3D volume from the one or more 2D primitives created on the 2D canvas, forming a volumetric region, which is a subset of the 3D volumetric data set, from an intersection between the 3D volume created from the one or more 2D primitives and the 3D volumetric data set, and displaying the volumetric region in a 3D scene, the 3D scene being shown in a second display window; and producing hydrocarbons from the subsurface hydrocarbon reservoir using the displayed volumetric region.

* * * * *